(12) United States Patent
Hasegawa et al.

(10) Patent No.: US 6,571,045 B2
(45) Date of Patent: May 27, 2003

(54) MICROSTRUCTURED OPTICAL FIBER

(75) Inventors: Takemi Hasegawa, Yokohama (JP);
Eisuke Sasaoka, Yokohama (JP);
Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/764,148

(22) Filed: Jan. 19, 2001

(65) Prior Publication Data

US 2001/0024557 A1 Sep. 27, 2001

Related U.S. Application Data

(60) Provisional application No. 60/246,760, filed on Nov. 9, 2000.

(30) Foreign Application Priority Data

Jan. 21, 2000 (JP) .......................... 2000-013185

(51) Int. Cl.$^7$ .............................. G02B 6/02; G02B 6/22
(52) U.S. Cl. ........................................ 385/125; 385/126
(58) Field of Search .................................. 385/125, 126

(56) References Cited

U.S. PATENT DOCUMENTS

| | | | | |
|---|---|---|---|---|
| 5,155,792 A | * | 10/1992 | Vali et al. ..................... | 385/125 |
| 5,440,664 A | * | 8/1995 | Harrington et al. .......... | 385/125 |
| 5,471,553 A | * | 11/1995 | Teshima ....................... | 385/125 |
| 5,570,447 A | * | 10/1996 | Liu .............................. | 385/125 |
| 5,802,236 A | | 9/1998 | DiGiovanni et al. ........ | 385/127 |
| 6,097,870 A | | 8/2000 | Ranka et al. ................. | 385/127 |
| 6,280,850 B1 | * | 8/2001 | Oh et al. ...................... | 385/126 |
| 6,334,019 B1 | * | 12/2001 | Birks et al. .................. | 385/125 |
| 2002/0001445 A1 | * | 1/2002 | Hasegawa et al. ........... | 385/125 |

FOREIGN PATENT DOCUMENTS

| | | |
|---|---|---|
| WO | 99/00685 | 1/1999 |
| WO | WO 00/16141 | 3/2000 |
| WO | WO 00/48952 | 8/2000 |
| WO | WO 00/72067 | 11/2000 |

OTHER PUBLICATIONS

T. A. Birks, J.C. Knight, and P. St. J. Russell, "Endlessly Single–Mode Photonic Crystal Fiber," Optics Letters vol. 22, No. 13, Jul. 1, 1997, pps. 961–963.

J.C. Knight et al., "Pure silica single –mode fibre with hexagonal photonic crystal cladding", OFC '96 PD3, Feb. 25, 1996.

J.C. Knight et al., "All silica single –mode optical fiber with photonic crystal cladding", Opt. Lett., v.21, p. 1547, Jan. 10, 1996.

J.C. Knight et al., "Properties of photonic crystal fiber and the effective index model", J. Opt. Soc. Am. A, v.15, p. 748, Mar. 1998.

J.C. Knight et al., "Large mode area photonic crystal fibre", Electron. Lett., v.34, p. 1347, Jun. 25, 1998.

J.C. Knight et al., "Photonic crystals as optical fibres –physics and applications", Opt. Mat., v.11, p. 143, Jan. 1999.

Tanya M. Monro et al., "Efficient modelling of holey fibers", OFC'99, Fg3, 1999.

Tanya M. Monro et al., "Holey optical fibers: an efficient modal model", J. Lightwave Technol., v. 17, p. 1093, Jun. 1999.

(List continued on next page.)

*Primary Examiner*—Tulsidas Patel
*Assistant Examiner*—Hae Moon Hyeon
(74) *Attorney, Agent, or Firm*—McDermott, Will & Emery

(57) ABSTRACT

In an optical fiber having a core region and a cladding region, surrounding the core region, comprising a main medium having different refractive indices from the main medium and spaced apart in the main medium, the core region comprises a central core region having a hollow portion disposed at the center of the core region and an outer core region surrounding the central core region having a mean refractive index higher than the central core region, and the core region has a higher mean refractive index than the cladding region.

12 Claims, 11 Drawing Sheets

OTHER PUBLICATIONS

T.M. Monro et al., "Developing holey fibres for evanescent field devices", Electron Lett., v.35, p. 1188, Jul. 8, 1999.

Tanya M. Monro et al., "Modeling large air fraction holey optical fibers", J. Lightwave Technol., v. 18, p. 50, Jan. 2000.

Tanya M. Monro et al., "Holey fibers with random cladding distributions", Opt. Lett., v.25, p. 206, Feb. 15, 2000.

Tanya M. Monro et al., "Microstructured optical fibres: new opportunities for sensing", OFS00, FR4–2, 2000.

J.C. Knight et al., "All –silica single–mode optical fiber with photonic crystal cladding: errata", Opt. Lett., v.22, p. 484 Apr. 1, 1997.

J. Broeng et al., "Photonic Crystal Fibers: A New Class of Optical Waveguides", Optical Fiber Technology 5, p. 305–330, 1999.

* cited by examiner

MICROSTRUCTURED OPTICAL FIBER

RELATED APPLICATIONS

This application claims priority from U.S. Provisional Patent Application No. 60/246,760, filed Nov. 9, 2000, and is incorporated herein by reference.

BACKGROUND OF THE INVENTION

1. Field of the Invention

The present invention relates to an optical fiber which can be suitably used as an optical transmission path and a dispersion compensator.

2. Related Background Art

FIG. 12 is a cross-sectional view of an optical fiber having so-called microstructures which has been known conventionally. As shown in FIG. 12, this optical fiber has a cross-sectional structure having a large number of voids 72 in a silica glass 71. A central portion in cross section having no voids 72 constitutes a core region 73 and a portion surrounding the core region 73 which has a large number of the voids 72 constitutes a cladding region 74.

The principle of light confinement of the optical fiber having such a microstructure is explained qualitatively using a concept called effective refractive indices (for example, T. A. Birks et al. optics Letters Vol. 22 p.961 (1997)). Due to the existence of the microstructure, in a strict sense, the refractive indices in the core region 73 and the cladding region 74 should have a complicate distribution. However, on the assumption that the optical guide characteristics can be approximated by replacing respective regions with uniform mediums, the refractive indices of these uniform mediums are called the effective refractive indices. The effective refractive indices $n_{\it eff}$ satisfy a following equation.

$$\left(\frac{f_1}{n_1^2} + \frac{f_2}{n_2^2}\right)^{-1} \leq n_{\it eff}^2 \leq f_1 n_1^2 + f_2 n_2^2 \qquad (1)$$

where n is the refractive index and f is the volume fraction. Further, a suffix 1 indicates silica glass and a suffix 2 indicates air. With respect to the volume fraction, $f_1+f_2=1$ holds. Usually, since $n_1>n_2$, the both side members of the equation (1) become smaller corresponding to the increase of $f_2$. Accordingly, the effective refractive index of the cladding region 74 having a large number of voids 72 becomes smaller than the effective refractive index of the core region 73 so that the light confinement is realized in the same manner as the usual optical fiber.

Such a model of the effective refractive indices is considered to be reasonable in a case that the optical wavelength is large compared to the scale of the microstructure. However, as the optical wavelength becomes shorter, the light is locally concentrated at portions having the high refractive index and hence, although the effective refractive indices are elevated, simultaneously, it is considered that the assumption that the structure having refractive index distribution can be replaced by the uniform mediums will lose the validity.

On the other hand, an optical fiber having a greater negative dispersion than such an optical fiber is disclosed U.S. Pat. No. 5,802,236, for example. Although this optical fiber has a similar microstructure, the optical fiber is characterized in that a cladding region is constituted by an inner cladding region and an outer cladding region and the effective refractive index of the inner cladding region is smaller than the outer cladding region.

SUMMARY OF THE INVENTION

However, although the optical fiber disclosed in the above-mentioned publication increases the negative dispersion compared to the optical fiber having the uniform cladding structure, the optical fiber suffers from a drawback that the effective core area is decreased.

The invention has been made in view of the above and it is an object to provide an optical fiber which can make the negative dispersion thereof greater than an optical fiber having a uniform cladding structure so as to increase the effective core area.

An optical fiber according to the present invention has a core region and a cladding region, surrounding the core region, comprising a main medium and sub mediums having different refractive indices from the main medium and spaced apart in the main medium. The core and cladding regions are extending along a fiber axis. The core region comprises of a central core region having a hollow portion disposed at the center of the core region and extending along the fiber axis, and an outer core region surrounding the central core region having a mean refractive index higher than the central core region and extending along the fiber axis. And the core region has a higher mean refractive index than the cladding region.

According to this configuration, the optical fiber according to the present invention has more negative waveguide dispersion than the optical fiber having a uniform cladding structure. Further, the effective core area can be increased. Accordingly, the optical fiber can attain the larger negative waveguide dispersion and at the same time can ensure the larger effective core area compared to the conventional optical fiber.

In this optical fiber, the main medium constituting the core and cladding region may be silica glass and the ratio of the optical power of the fundamental mode propagating in the hollow portion to the total power of the fundamental mode may be 1% or higher, and more preferably 10% or higher at a predetermined wavelength.

Such an optical fiber is suitable for realizing an optical transmission path of low nonlinearity and low transmission loss. In the prior art, almost all the optical power of the fundamental mode propagating in the optical fiber propagates in the inside of the main medium and hence, the nonlinearity and the transmission loss of the optical fiber become substantially equal to those of the main medium. However, by increasing the ratio of optical power of the fundamental mode propagating in the hollow portion, the nonlinearity and the transmission loss of the optical fiber take intermediate values between those of the hollow portion and the main medium. Then, by filling an inactive gas or a dry air having low nonlinearity and low transmission loss into the hollow or by keeping the hollow portion under vacuum, an optical transmission path of low nonlinearity and low transmission loss can be realized. Silica glass may be doped with Ge, F, B, P, Ti or the like so as to change the transmission characteristics of the optical fiber.

It is preferable that at least one end of the hollow portion is closed and it is more preferable to dispose hollow portions having both ends closed periodically along the fiber axis.

Due to such configuration, the occurrence of the transmission loss derived from the intrusion of contaminants into the hollow which opens at the fiber end can be prevented. Further, with the presence of portions where the hollow portions are closed, it becomes easy to cut the fiber at these portions and to realize the optical coupling between the fiber and other optical part.

The inside of the hollow may be kept under vacuum or may be preferably filled with a gas having optical gain characteristics such as $H_2$ and $NH_3$. By keeping the hollow portion under vacuum, the low nonlinearity and the low transmission loss can be realized. Further, by filling the gas having the optical gain characteristics into the hollow, an optical amplifying fiber can be realized. In such an optical fiber, since the ratio of the optical power propagating in the main medium is low, the nonlinear optical effect hardly occurs even when the optical power is increased to the high power.

DESCRIPTION OF THE PREFERRED EMBODIMENTS

Figure 1:
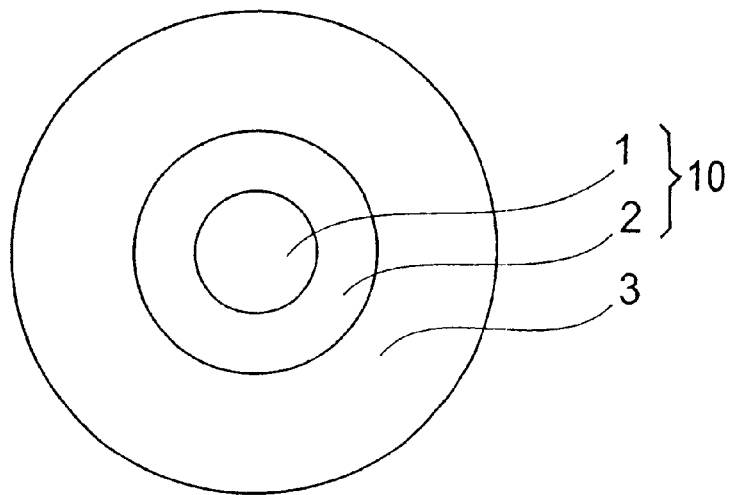
FIG. 1 is a view showing the division of regions on a cross section of an optical fiber according to the invention.

Embodiments of the invention are explained in conjunction with attached drawings hereinafter. To facilitate the comprehension of the explanation, the same reference numerals denote the same parts, where possible, throughout the drawings, and a repeated explanation will be omitted. Further, the size ratio of respective drawings does not necessarily agree with the size ratio of the explanation of the Mode for carrying out the Invention.

Figure 2:
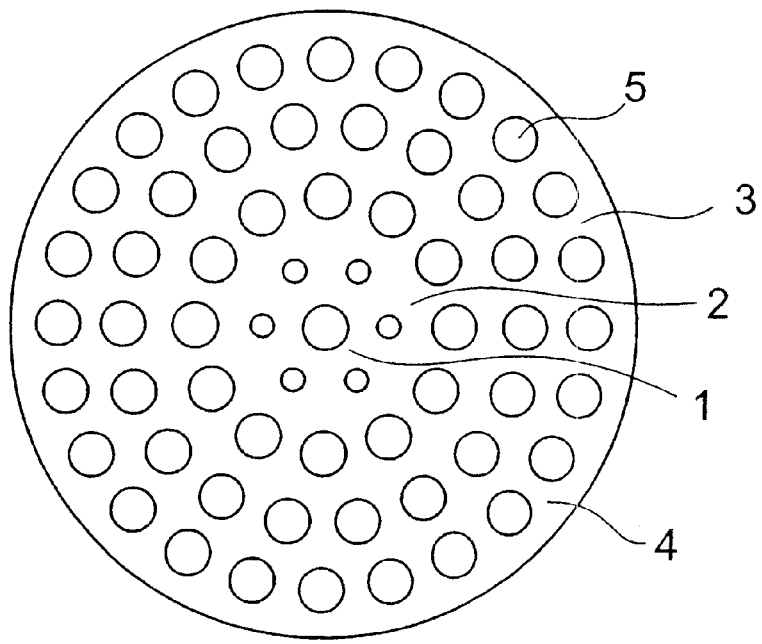
FIG. 2 is a transverse cross-sectional view showing the structure of the optical fiber.

FIG. 1 is a view showing the division into regions on a cross section of an optical fiber of one embodiment of the invention. FIG. 2 is a cross-sectional view for explaining a microstructure of the optical fiber of the embodiment. As shown in FIG. 1, in this embodiment, the cross section is constituted by a first core region 1, a second core region 2 which surrounds the first core region 1, and a cladding region 3 which surrounds the second core region 2. The region includes the first core region 1 and the second core region 2 is herein after called a core region 10. Further, as shown in FIG. 2, these respective regions are comprised of silica glass 4 which constitutes a main medium and a large number of voids 5 which constitute sub-mediums.

Figure 3:
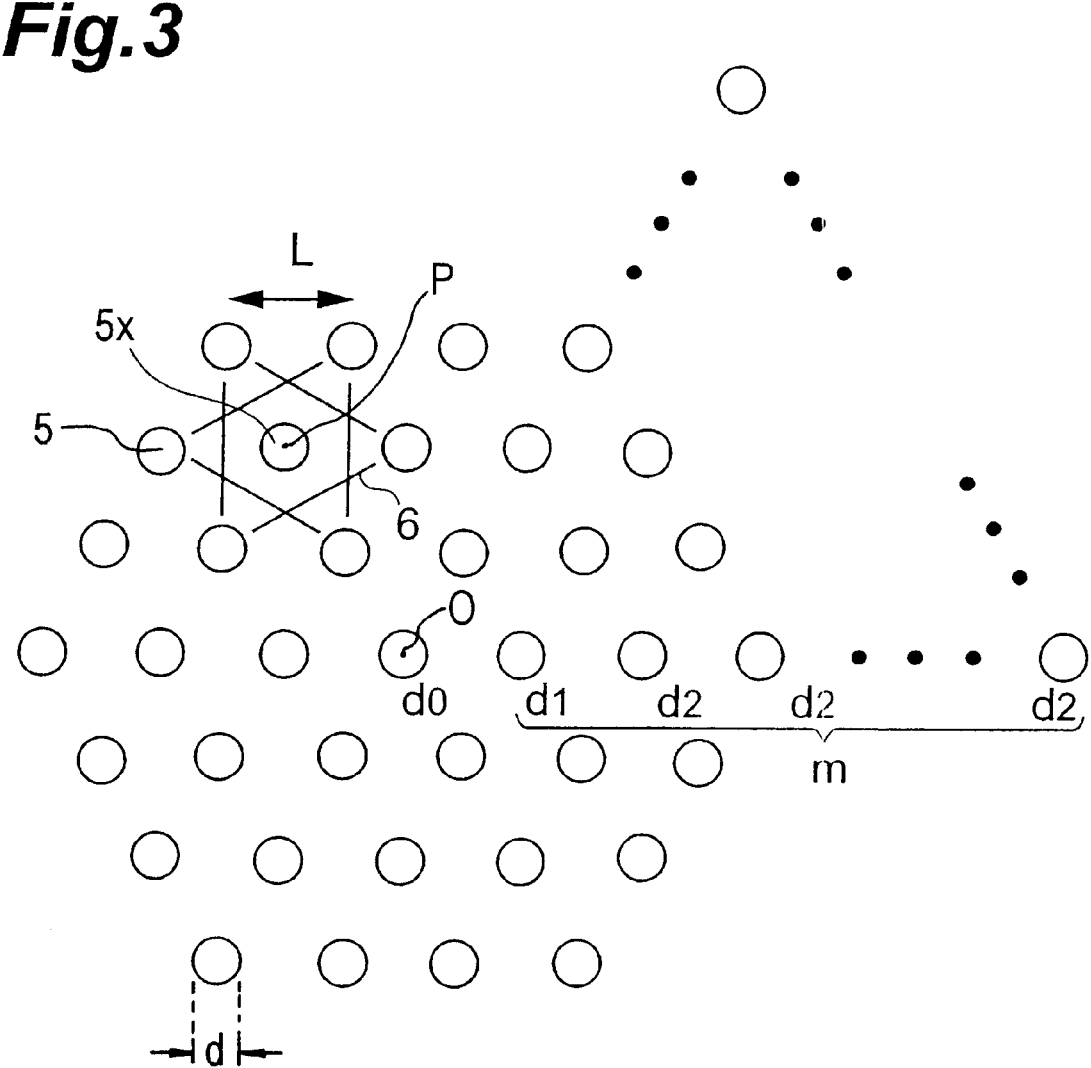
FIG. 3 is a view for explaining the definition of the mean refractive indices of the invention.

In this embodiment, to classify the refractive indices of respective regions, a concept called the mean refractive indices is used. Since the effective refractive indices are defined using the approximation, the definition is ambiguous and hence is not suitable for the description of the structure. Accordingly, this embodiment does not employ the effective refractive indices. FIG. 3 is a view for explaining the manner of determining the mean refractive indices of the optical fiber of this embodiment. With respect to one void focused in a certain region, perpendicular bisectors are drawn between this void 5x and other surrounding voids 5. Then, a polygon which is partitioned by these perpendicular bisectors and includes only the void 5x is defined. This polygon is called a cell 6. In this cell 6, the mean refractive index $n_{avg}$ can be calculated by a following equation.

$$n_{avg} = \sqrt{\frac{n_g^2(A_{cell} - A_{hole}) + n_h^2 A_{hole}}{A_{cell}}} \quad (2)$$

where, $n_g$ is the refractive index of a fiber material portion, $n_h$ is the refractive index of the void 5x portion, $A_{cell}$ is a whole area of the cell 6, and $A_{hole}$ is an area of the void 5x. The mean refractive index $n_{avg}$ of a given region can be expressed by a following equation. In the equation, the cell numbers of the cells 6 included in the region is set as j-k, a mean refractive index and the cell area of the i-th cell 6 are respectively set as $n_{avg}$ and $A_{cell,i}$.

$$N_{avg} = \sqrt{\frac{\sum_{i=j}^{k} n_{avg,i}^2 A_{cell,i}}{\sum_{i=j}^{k} A_{cell,i}}} \quad (3)$$

This embodiment is characterized by setting the mean refractive index of the core region 10 higher than the refractive index of the cladding region 3. The mean refractive indices $N_{avg}$ of respective regions can be set by adjusting the magnitude of the voids 5. That is, by increasing or decreasing the cross-sectional area of voids 5 per a unit cross-sectional area, the ratio between the silica glass 4 which constitutes the main medium and the voids 5 which constitute the sub mediums can be increased or decreased and hence, the mean refractive index $N_{avg}$ of the region can be set to an arbitrary value.

Inventors have prepared three kinds of optical fibers which differ in the diameter of the voids 5 and the pitch (called "examples 1 to 3") and have carried out a comparison of characteristics between these optical fibers and an optical fiber having a conventional-type uniform cladding structure (called "comparison example"). The result of the comparison is reported hereinafter.

In any one of the optical fibers of the examples 1 to 3 and the comparison example, the pitch L of the voids 5 is constant and the number of layers m is 7. The cell region which adopts the void 5 disposed at the fiber center of the optical fiber as the center thereof corresponds to the first core region 1, the six cells 6 which surround the first core region correspond to the second core region 2, and 162 cells 6 disposed outside the second core region correspond to the cladding region 3.

The respective pitches L and the distribution of the ratio d/L in respective regions between the diameter of voids 5 and the pitch L in the examples 1 to 3 and the comparison example are shown in Table 1.

TABLE 1

| | | distribution of diameter of voids | | |
|---|---|---|---|---|
| | Pitch L | 1st core region | 2nd core region | cladding region |
| example 1 | 1.22 μm | 0.3 | 0.2 | 0.4 |
| example 2 | 1.23 μm | 0.4 | 0.2 | 0.4 |
| example 3 | 1.25 μm | 0.5 | 0.2 | 0.4 |
| comparison example | 1.20 μm | 0.2 | 0.2 | 0.4 |

Figure 4:
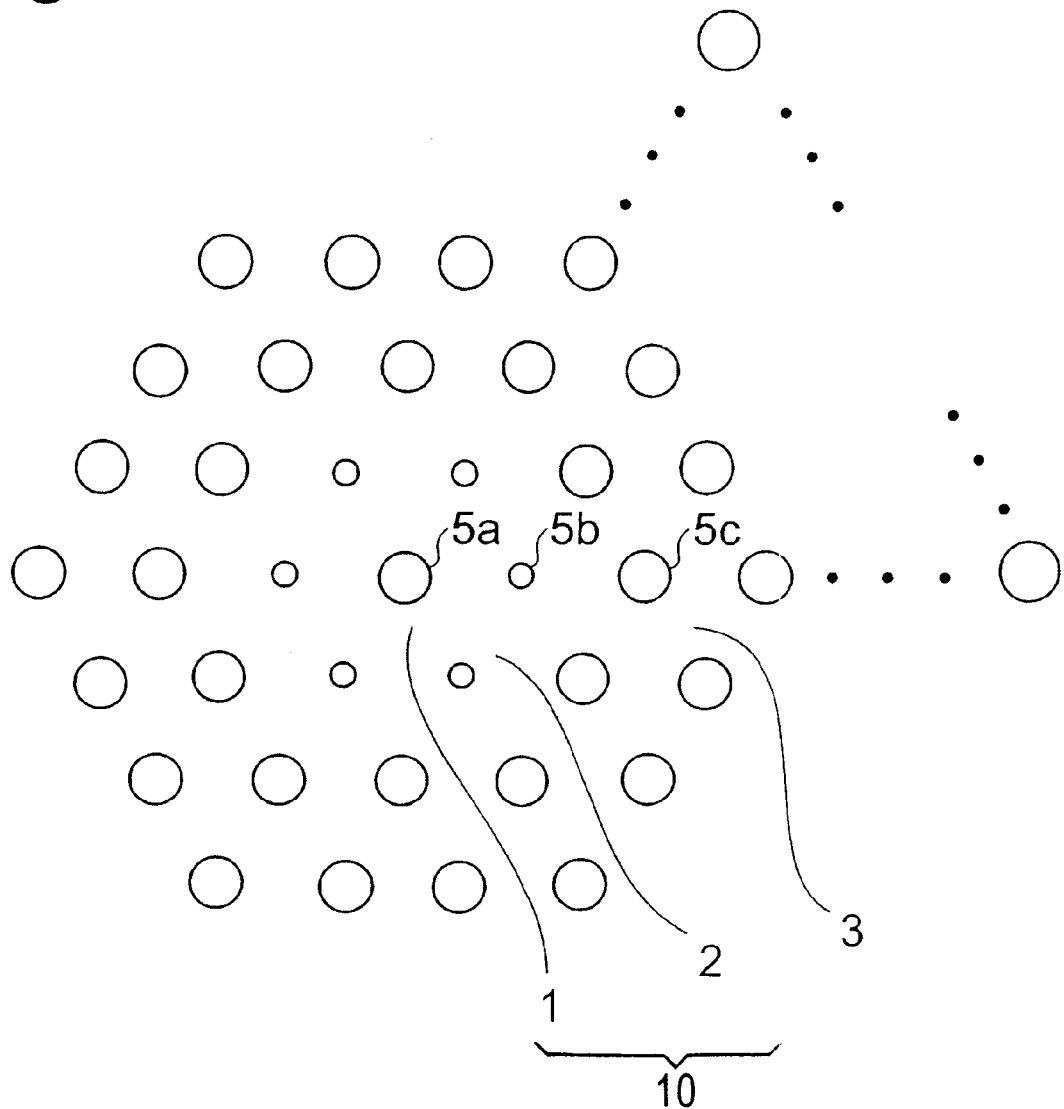
FIG. 4 is a view showing the cross-sectional structure of an optical fiber of an example 2.

As can be understood from Table 1, the respective examples 1 to 3 and the comparison example differ only in the diameter of the void 5 present at the center of the optical fiber. FIG. 4 shows the cross-sectional structure of the example 2. The voids 5a, 5b or 5c are arranged on each hexagonal lattice, wherein the voids 5b in the second core region 2 has smaller diameter compared to the voids in other regions. Due to such a constitution, it becomes possible to make the mean refractive index of the second core region 2 larger than the mean refractive index of the cladding region 3 and simultaneously to make the mean refractive index of the first core region 1 smaller than the mean refractive index of the second core region 2.

Figure 5:
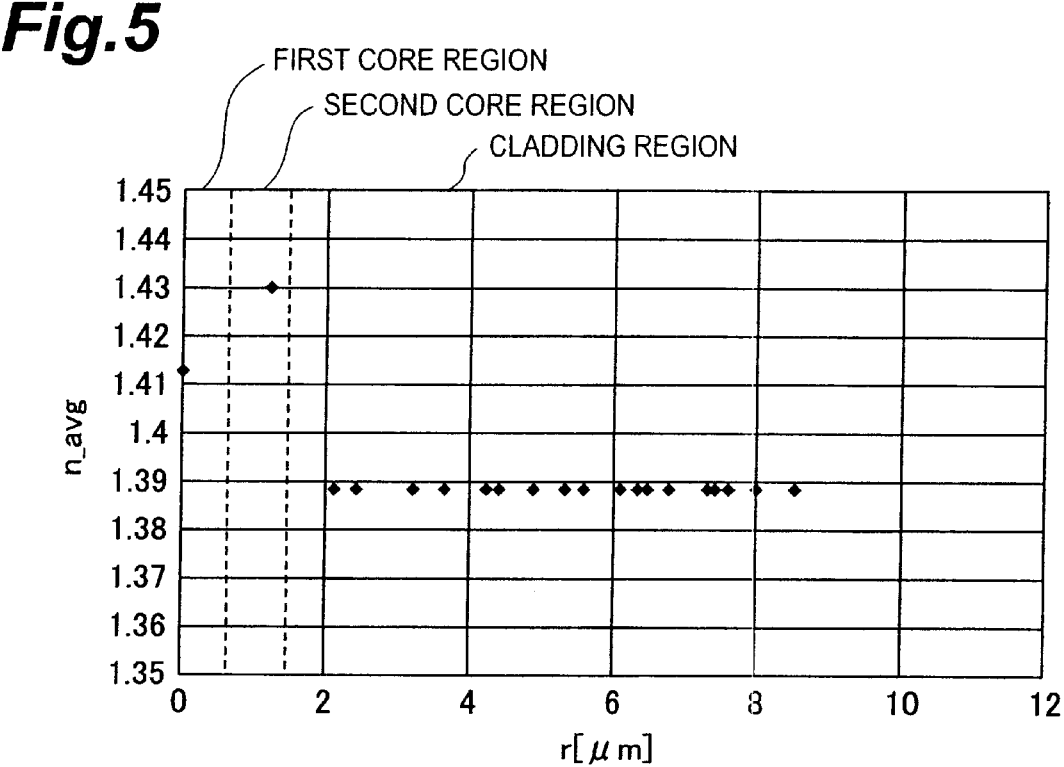
FIG. 5 and FIG. 6 are respectively diagrams showing the distribution of the mean refractive indices in examples 1 and 3.
Figure 6:
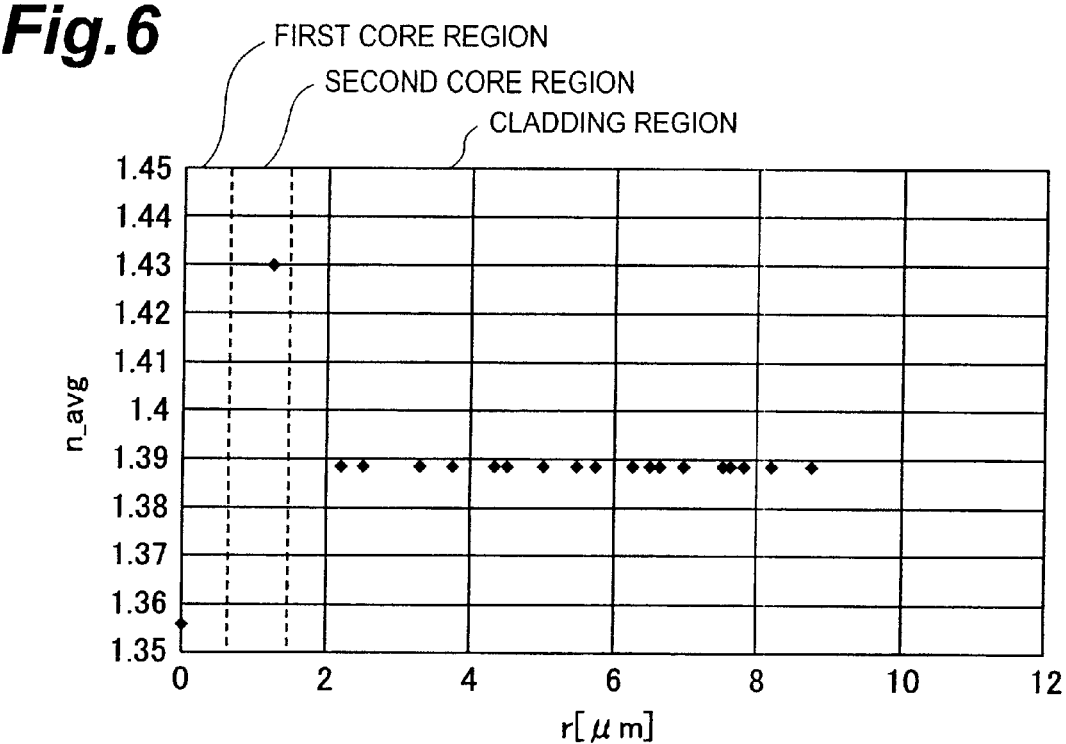

FIG. 5 and FIG. 6 express the mean refractive indices $n_{avg}$ of respective cells as diagrams where the center P of each void 5 is set as the position of the cell 6 and the distance from an origin O (fiber axis) to P is set as r with respect to respective examples 1 and 3. Here, the calculation was performed by setting the refractive index of the silica glass 4 which constitutes the material as 1.444 and the refractive index of air as 1.

In both examples, in the second core region 2, since the diameter of the voids 5 is small, the mean refractive index becomes high, while in the first core region 1, since the diameter of the voids 5 is large, the mean refractive index becomes low. The mean refractive index of the whole core region 10 is made higher than the mean refractive index of the cladding region 3 in all examples.

Figure 7:
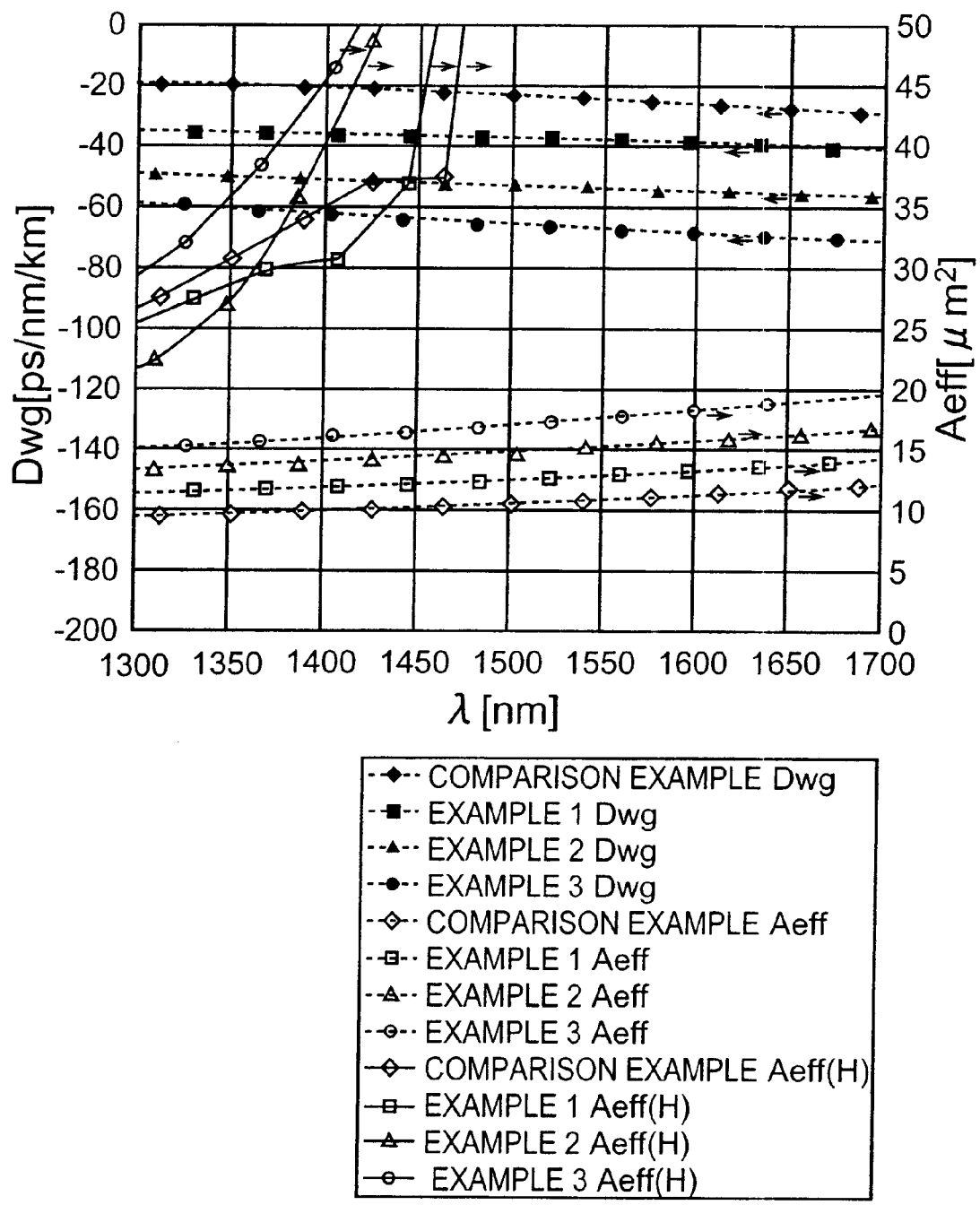
FIG. 7 is a view showing the calculated result of the waveguide dispersion and the effective core area of the examples 1 to 3 together with those of a comparison example.

FIG. 7 shows the result of a comparison between respective examples 1 to 3 and the comparison example with respect to the waveguide dispersion $D_{wg}$ and the effective core area $A_{eff}$. In the drawing, the waveguide dispersion $D_{wg}$ is taken on the axis of the left-side ordinates, the effective core area $A_{eff}$ is taken on the axis of the right-side ordinates and the optical wavelength λ is taken on the axis of abscissa. Broken lines show the characteristics of fundamental mode and solid lines show the characteristics of higher order mode. All of examples 1 to 3 and the comparison example have the cut-off of high-order mode in the vicinity of 1.5 μm. With respect to the waveguide dispersion $D_{wg}$, it is made gradually larger in order of the comparison example, the example 1, the example 2 and the example 3. With respect to the effective core area $A_{eff}$, it is also made gradually larger in order of the comparison example, the example 1, the example 2 and the example 3. In this manner, it has been confirmed that, according to this embodiment, it becomes possible to obtain the large effective core area $A_{eff}$ as well as the large negative waveguide dispersion.

In this manner, since the optical fiber has the large effective core area, the occurrence of the nonlinear optical phenomena can be suppressed so that the transmission quality can be enhanced. Further, since the optical fiber has the large negative waveguide dispersion, the fiber length necessary for compensating for the positive waveguide dispersion can be made short.

In the above-mentioned embodiment, although the explanation has been made with respect to the case that the voids are formed in the core region and the cladding region and air is filled in the insides of the voids, with respect to regions other than the first core region 1, the microstructure region may be formed with a medium which differs in the refractive index from the material of the optical fiber which constitutes the main medium in place of the voids. Further, with respect to the void 5a of the first core region 1, the inside thereof may be formed in a vacuum state or may be filled with a material having optical gain characteristics such as $H_2$ and $NH_3$.

By making the inside of the void 5a in a vacuum state, the low transmission loss and the low non-linearity can be realized. Further, by filling the material having optical gain characteristics into the void 5a, an optical amplifying YES fiber which can suppress the nonlinear optical effect in the silica glass can be realized.

Here, the optical power of the fundamental mode which propagates through the voids 5 is preferably set to not less than 1% of the optical power of the fundamental mode which propagates through the optical fiber and is more preferably set to not less than 10% at a predetermined wavelength. To increase the optical power which transmits through the cavities, the structure shown in FIG. 8 is suitable.

Figure 8:
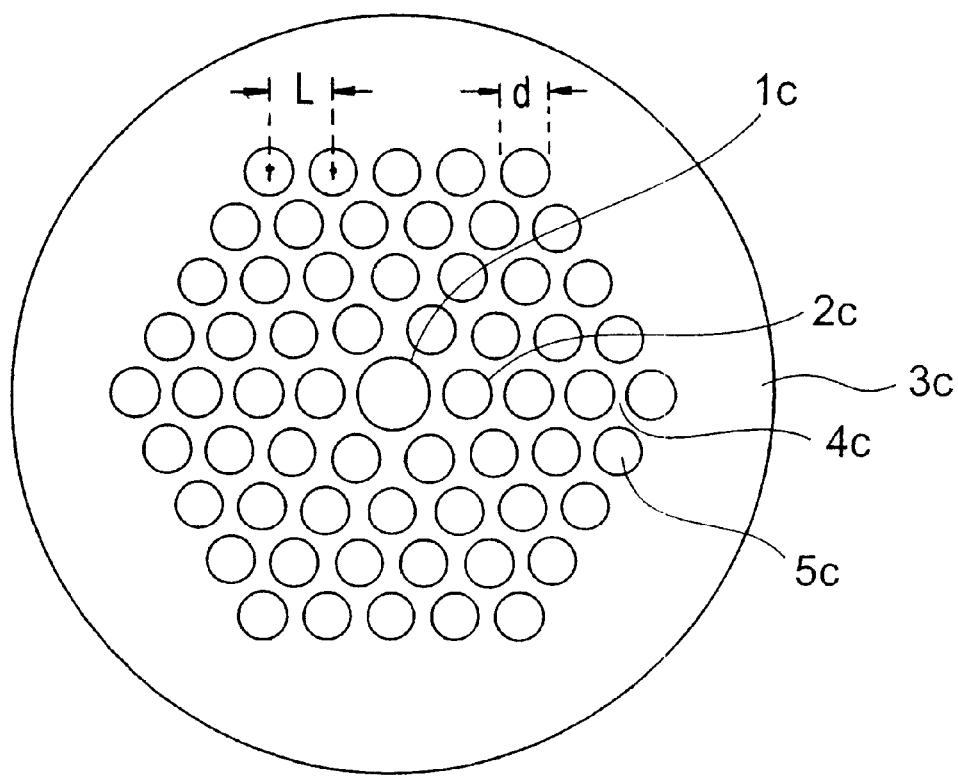
FIG. 8 is a transverse cross-sectional view showing the structure of an optical fiber of other embodiment of the invention.

In an embodiment shown in FIG. 8, a first core region 1c, a second core region 2c and a cladding region 3c are respectively constituted by forming voids 5c which constitute a sub medium in silica glass 4c which constitutes a main medium, wherein the ratio d/L being the diameter of void/pitch respective regions is set to 0.86, 0.77 and 0.80.

Figure 9:
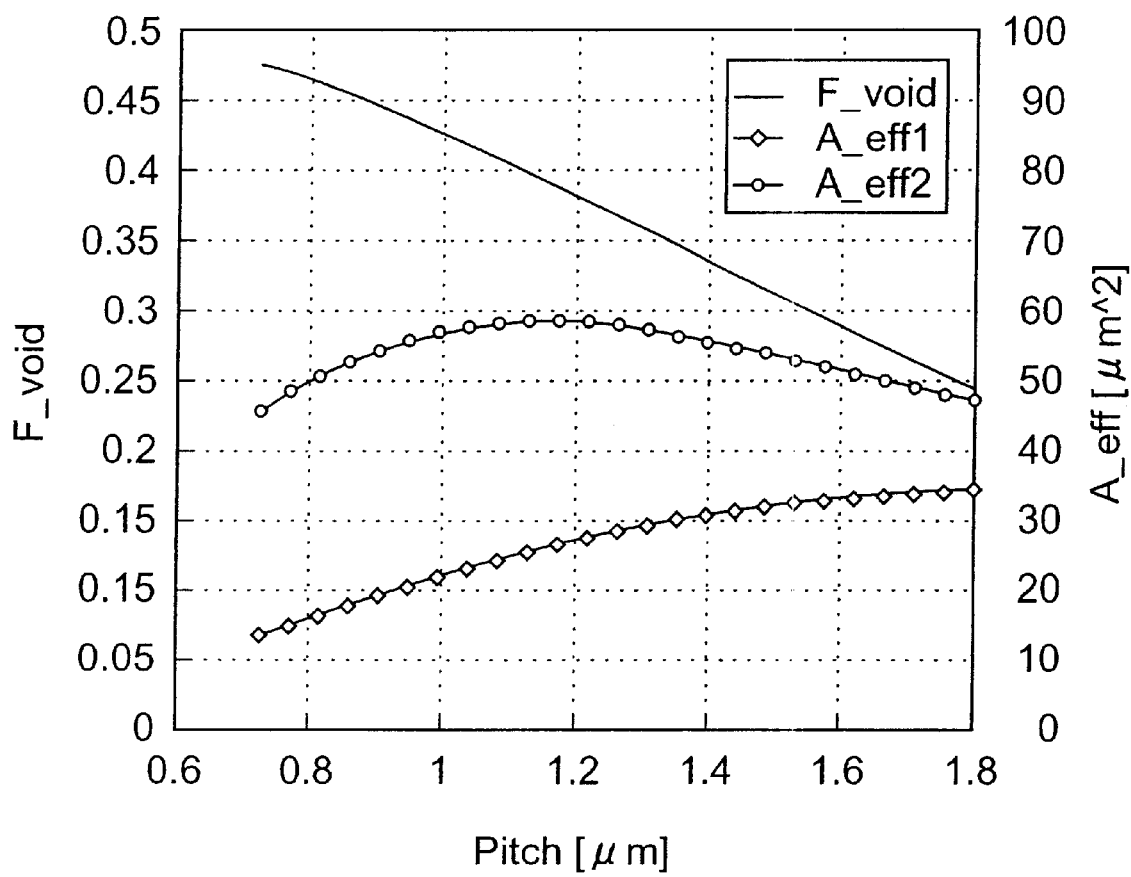
FIG. 9 is a graph in which the ratio of the optical power which propagates in a hollow portion and the effective core area to the pitch are plotted.

FIG. 9 shows the ratio $F_{void}$ of an optical power of the fundamental mode which propagates through hollow portions at the wavelength of 1550 nm and the effective core area $A_{eff}$ when the pitch L is changed in the range of 0.8 μm to 1.8 μm are shown. Here, as the effective core area, two different values $A_{eff1}$, $A_{eff2}$ are shown in the graph. Out of these values, the value $A_{eff1}$ is a value obtained by a usual definition which is expressed by a following equation.

$$A_{eff1} = \frac{\left\{\int_\Omega |E|^2 \, dA\right\}^2}{\int_\Omega |E|^4 \, dA} \quad (4)$$

Here, E indicates a electromagnetic field and Ω indicates a whole cross section of the fiber. The effective core area defined by the equation (4) is useful as an index of the nonlinearity in the usual optical fiber. On the other hand, in the optical fiber of the present invention which contains the sub medium which can ignore the nonlinearity, the effective core area $A_{eff2}$ expressed by a following equation should be rather used as the index.

$$A_{eff2} = \frac{\left\{\int_\Omega |E|^2 \, dA\right\}^2}{\int_{\Omega_1} |E|^4 \, dA} \quad (5)$$

Here, $\Omega_1$ indicates the region of the main medium (region excluding the region of sub medium which can ignore the nonlinearity).

As can be understood from FIG. 9, in such an optical fiber, the ratio $F_{void}$ of the optical power which propagates through the sub medium region is high such that the ratio $F_{void}$ is not less than 25%. Further, in FIG. 9, $A_{eff2}$ is higher than $A_{eff1}$.

This implies that by making a part of the optical power propagate through the sub medium having nonlinearity, the nonlinearity of the fiber can be reduced.

Figure 10A:
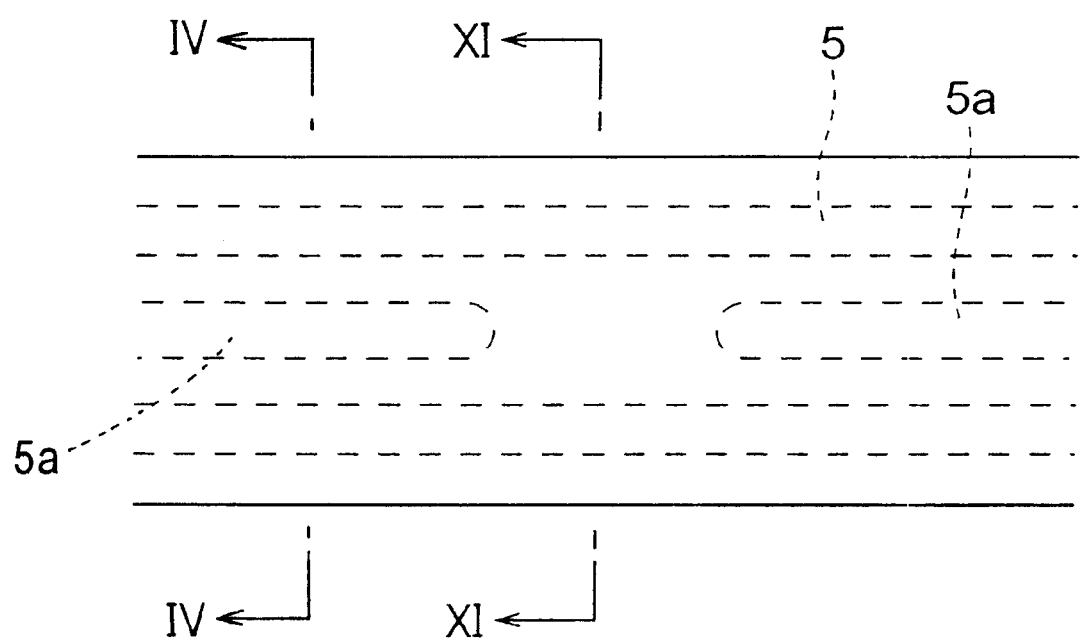
FIGS. 10A to 10C are longitudinal cross-sectional views showing the structures of optical fibers of other embodiments of the invention.
Figure 10B:
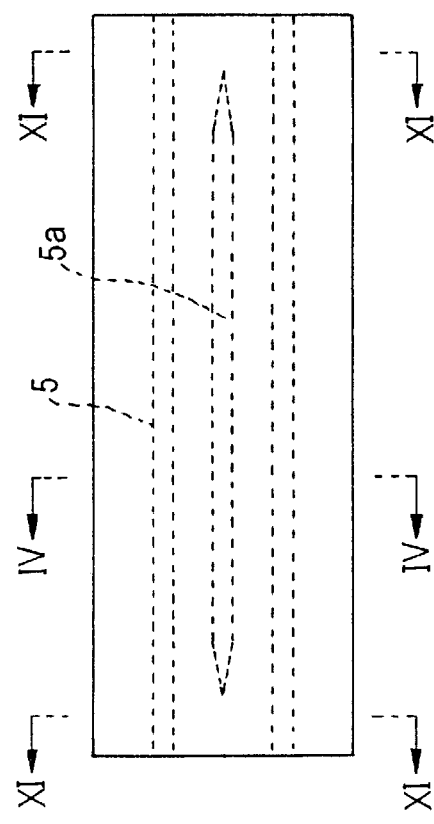
Figure 10C:
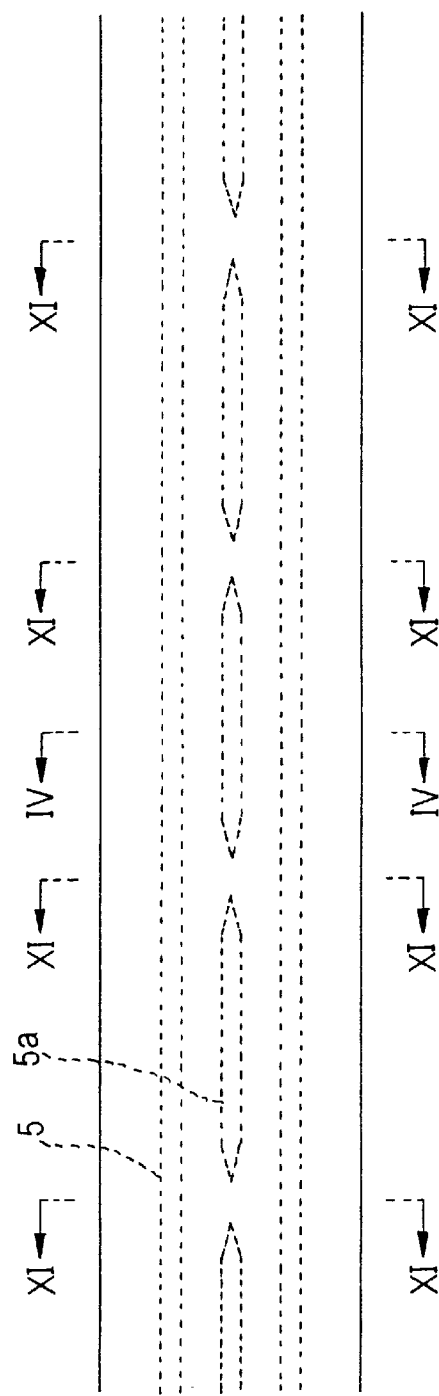
Figure 11:
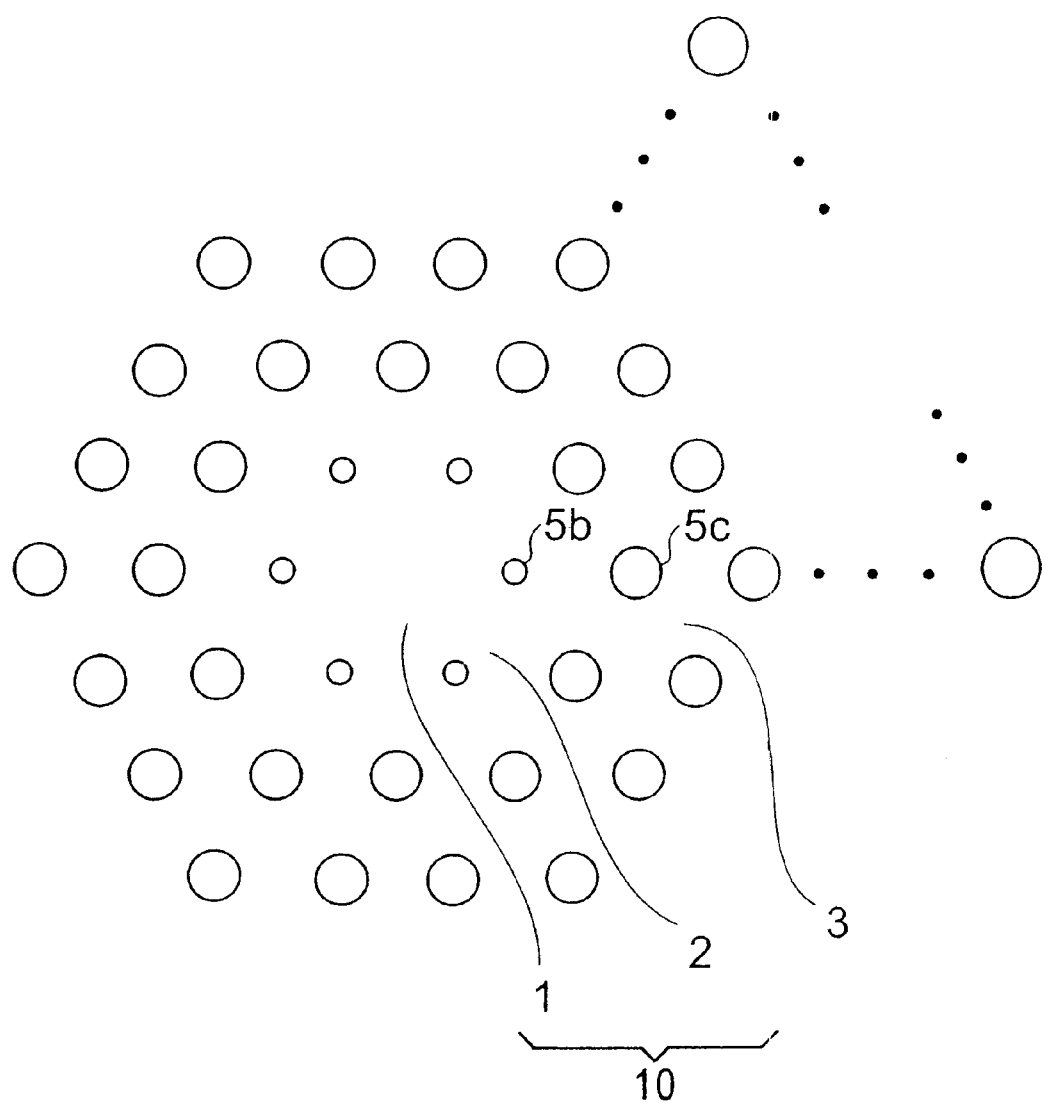
FIG. 11 is a cross-sectional view of FIG. 10A taken along a line XI—XI.
Figure 12:
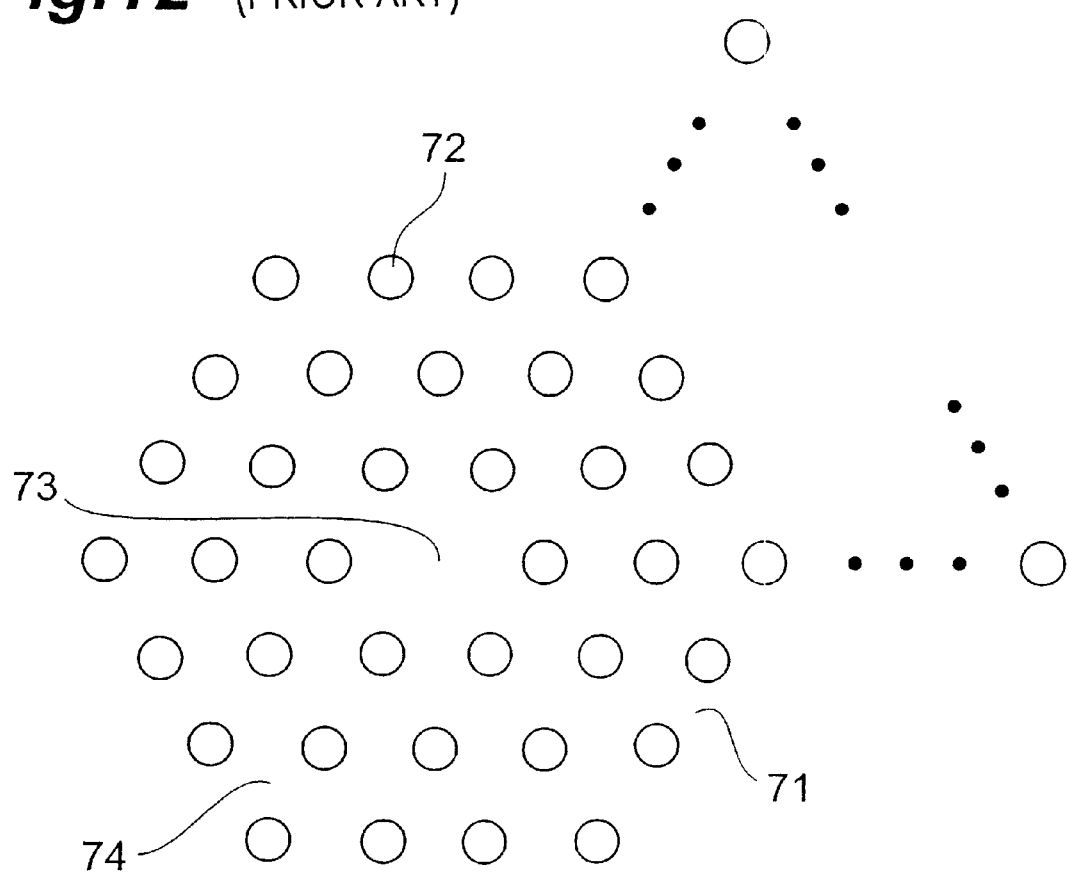
FIG. 12 is a cross-sectional view of an optical fiber including a microstructure which has been known conventionally.

It is unnecessary for the optical fiber of the present invention to have a cross-sectional structure which is uniform in an axial direction. For example, as indicated by a longitudinal cross-sectional structure shown in FIGS. 10A–10C, portions where the hollow portions are closed (portions whose transverse cross-section are shown in FIG. 11) may be formed at one position, as shown in FIG. 10A, or several positions in the axial direction, as shown in FIGS. 10B and 10C. Further, when the closed portions are formed at plural positions, it is preferable to periodically arrange the closing portions in the axial direction, as shown in FIG. 10C.

As a result, in the scheme shown in FIG. 10B, the intrusion of contaminants such as vapor and the like into the cavities having fiber ends thereof opened can be prevented. Accordingly, in the scheme shown in FIG. 10B, the occurrence of the transmission loss increase accompanying the optical coupling of the optical fiber with other optical part can be prevented. Further, in the scheme shown in FIG. 10C, with the provision of periodic presence of these closed portions in the axial direction of the fiber, when it becomes necessary to perform the connection, the fiber may be cut at these portions and then may be connected so as to facilitate the connection of low loss.

Here, although only the embodiment where only the core hollow portion 5a is periodically closed, a structure where other voids 5 may be closed at the same period may be adopted.

What is claimed is:

1. An optical fiber having a core region and a cladding region surrounding said core region, said optical fiber comprising a main medium and sub mediums having different refractive indices from said main medium and spaced apart in said main medium, and said core region and cladding region are extending along a fiber axis, wherein
   said core region comprises:
      a central core region having a hollow portion disposed at the center of said core region and extending along the fiber axis; and
      an outer core region surrounding said central core region having a mean refractive index higher than said central core region and extending along the fiber axis, and
   said core region has a higher mean refractive index than said cladding region.

2. An optical fiber according to claim 1, wherein the main medium constituting said core and cladding regions is silica glass and the ratio of an optical power propagating in said hollow portion to a total power is 1% or higher.

3. An optical fiber according to claim 2, wherein the ratio of the optical power propagating in said hollow portion to the total power is 10% or higher.

4. An optical fiber according to claim 1, wherein at least one end of said hollow portion is closed.

5. An optical fiber according to claim 4, wherein a plurality of said hollow portions having both ends closed are periodically disposed along the fiber axis.

6. An optical fiber according to claim 1, wherein the inside of said hollow portion is vacuum.

7. An optical fiber according to claim 1, wherein a gas having an optical gain characteristics is filled in the inside of said hollow portion.

8. An optical fiber according to claim 1, wherein the main medium constituting said core and cladding regions is silica glass and the ratio of an optical power of the fundamental mode propagating in said hollow portion to a total power of the fundamental mode is 1% or higher at a predetermined wavelength.

9. An optical fiber according to claim 8, wherein the ratio of the optical power of the fundamental mode propagating in said hollow portion to the total power of the fundamental mode is 10% or higher at a predetermined wavelength.

10. An optical fiber according to claim 8, wherein the predetermined wavelength is between equal to or greater than 1300 nm and less than or equal to 1700 nm.

11. An optical fiber according to claim 2, wherein said sub mediums comprise voids formed within said main medium, said voids bearing at least one of a gas, a gas mixture, and a vacuum.

12. An optical fiber according to claim 8, wherein said sub mediums comprise voids formed within said main medium, said voids bearing at least one of a gas, a gas mixture, and a vacuum.

* * * * *